United States Patent [19]

Hammar

[11] Patent Number: 5,709,122
[45] Date of Patent: Jan. 20, 1998

[54] TOOL

[76] Inventor: Lars Hammar, Box 15, S-790 21 Bjursås, Sweden

[21] Appl. No.: 634,555

[22] Filed: Apr. 18, 1996

[30] Foreign Application Priority Data

Apr. 19, 1995 [SE] Sweden ................... 9501435

[51] Int. Cl.⁶ .......................... B21D 28/00; B21D 39/00
[52] U.S. Cl. ................ 72/326; 72/409.13; 72/461; 269/8; 269/303
[58] Field of Search ................. 72/326, 409.04, 72/409.13, 461, 428; 269/8, 303, 315, 319

[56] References Cited

U.S. PATENT DOCUMENTS

| | | | |
|---|---|---|---|
| 851,931 | 4/1907 | Grossman | 269/303 |
| 2,166,347 | 7/1939 | Farney | 72/461 |
| 2,383,008 | 8/1945 | Meister | 269/315 |
| 4,900,888 | 2/1990 | Lee | 269/8 |
| 5,412,971 | 5/1995 | Axelsson . | |

FOREIGN PATENT DOCUMENTS

| | | | |
|---|---|---|---|
| 465253 | 3/1975 | U.S.S.R. | 72/428 |
| 709317 | 1/1980 | U.S.S.R. | 269/8 |

*Primary Examiner*—Daniel C. Crane
*Attorney, Agent, or Firm*—Natter & Natter

[57] ABSTRACT

A tool for manufacturing signs wherein selective sign display elements are retained in a base profile section by folded engagement of opposite end portions of the base section. The tool includes members for cutting the base section, compression members for deforming the base section to secure the sign elements from disengagement with the base section and a punch for providing an aperture in the base section. The tool further includes a guide surface for positionally aligning the base section and gauge blocks for displacing the guide surface generally perpendicular to a longitudinal axis of the base section to accommodate respective base sections having different width dimensions. A stop member restricts movement of the sign display elements when cutting the base section.

11 Claims, 5 Drawing Sheets

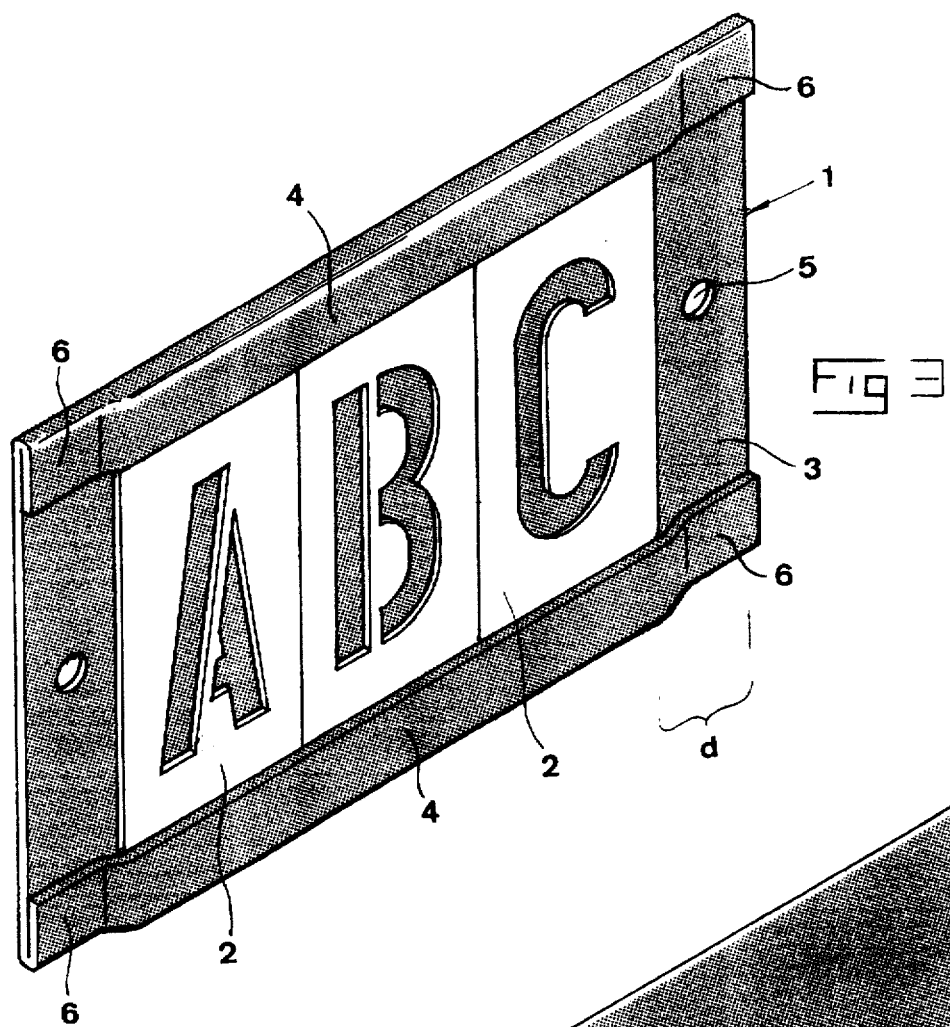
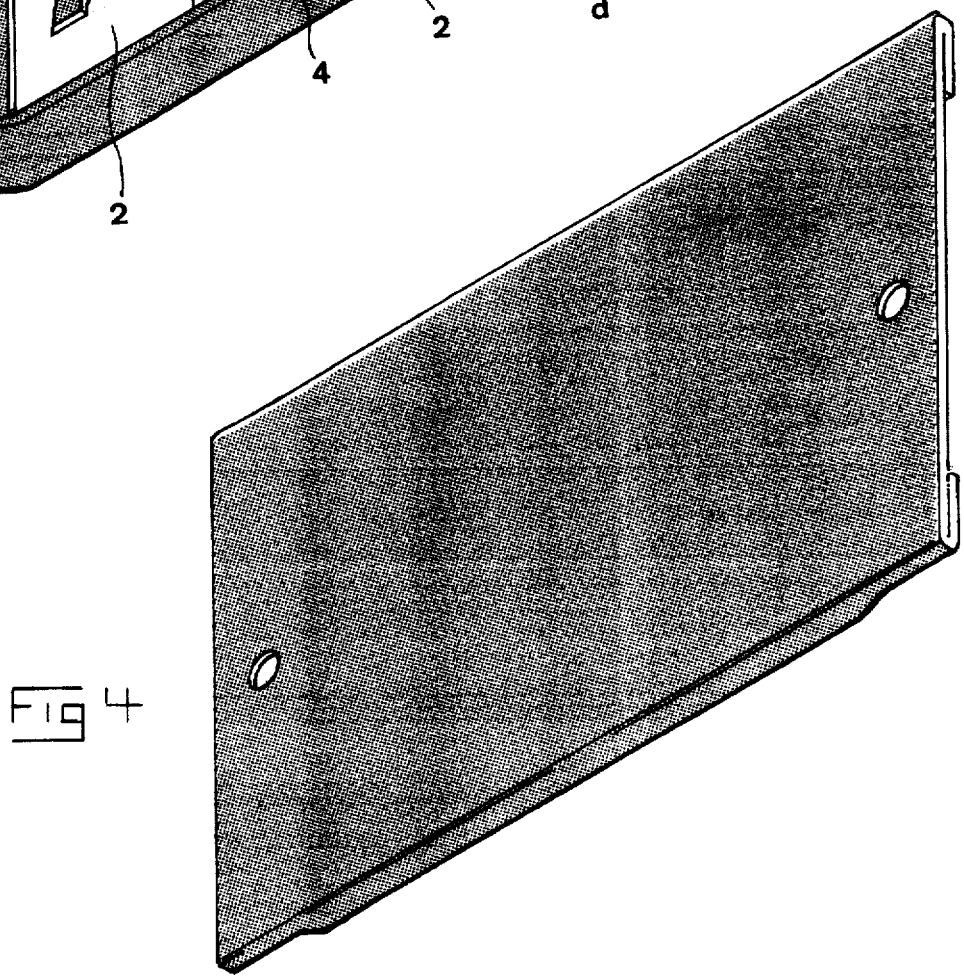

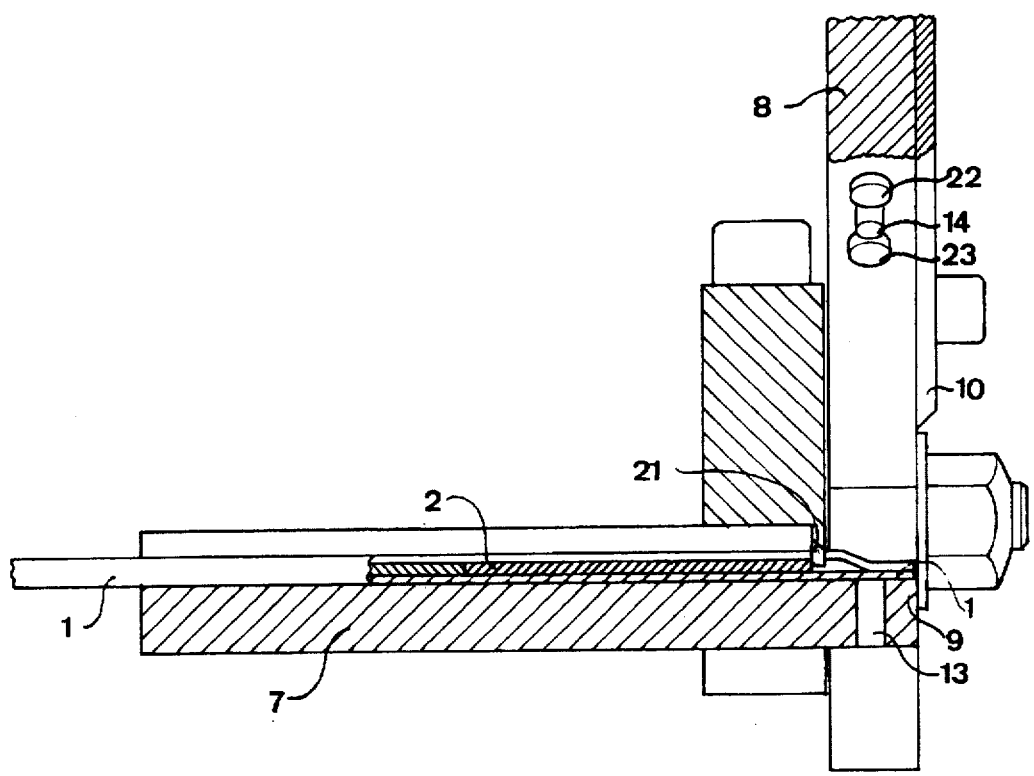
Fig 5
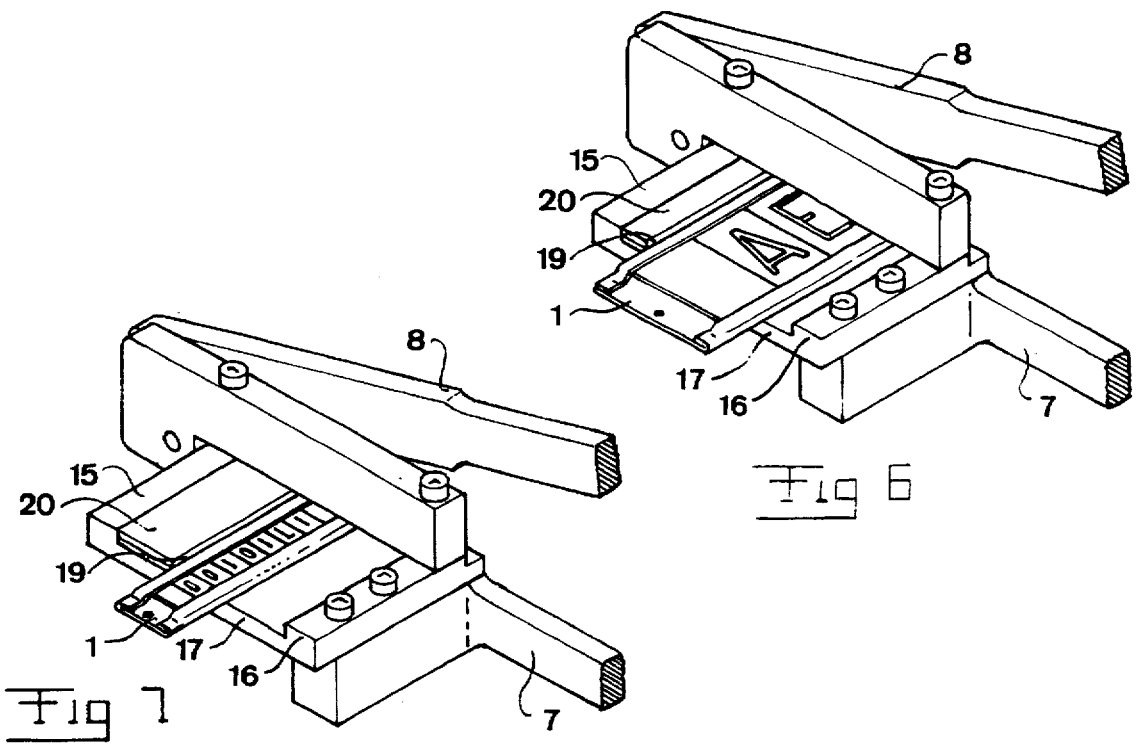
Fig 6
Fig 7

TOOL

FIELD OF THE INVENTION AND PRIOR ART

The object of this invention is a tool to be used during manufacture of signs of the type presenting a base profile and sign elements engaging therewith, which tool comprises members for cutting the base profile, members for deformation of the base profile, to form an obstacle for inhibiting the sign elements from disengaging the base profile, and at least one support surface against which the base profile is positioned at a fixed angle to the plane for cutting the same off.

The base profile of signs of the type here being referred to presents folded, longitudinal edge portions which make the base profile obtain a C-like form in cross section. The sign elements have the character of in general rectangular discs which are displaceably received in the base profiles as the folded edge portion of the base profiles overlaps the edge portions of the sign elements. The sign elements are fixed in the base profiles as the latter are deformed at their ends, more precisely as the folded edge portions are pressed towards the bottom portion of the base profiles. In other words, the base profiles, at their ends, will project a little bit beyond the sign elements arranged at the ends. At the end portions of the base profiles that project beyond the sign elements holes are arranged to make it possible to fix the signs to an optional support by means of, by way of example, screws, nails or rivets. Thereby it is desirable to be able to arrange such holes at the same corresponding position, also at signs with different widths, rationally and with precision. For example, in certain cases it is desirable to center such a hole in relation to the width of the base profile.

Such a combination tool as the one described through the patent SE 468 379 of the applicant is applicable for manufacture of such signs. The advantage of such a tool is that it, as it presents two parts that are mobile in relation to each other, comprises, on one hand, edge members for cutting the base profile off and, on the other hand, for deformation of the base profile, to form an obstacle to inhibit the sign elements from loosing engagement with the base profile, whereby conditions are created for accomplishing the off-cutting as well as the deformation in one and the same sequence of movement of the tool parts. Furthermore, the tool parts comprise members for cutting a hole in the base profile, and the tool presents guide surfaces defining a seat for the base profile.

However, the seat defining guide surfaces of this tool are positionally fixed in relation to the location where the members for cutting holes in the base profile cut out the hole or the holes in the latter. Thereby, a single tool is adapted to a certain base profile width. Because several base profile widths exist, one has been forced to provide several versions of tools, more precisely one for each base profile width. As base profiles of different widths are positioned in the tool by being supported in a suitable way by at least one of the guide surfaces, the hole or holes which, by means of the tool, are arranged in the base profile will be at non-corresponding locations at base profiles of different width. In the case where cutting of holes in the base profile is done in a central point of a base profile, the width of which is generally the same as the distance between the support surfaces, the members for cutting holes will even miss a base profile that has a width that goes below half this distance and which takes support against one of the support surfaces as it is positioned in the tool. Furthermore, the support surfaces are fixed as to position in relation to a stop member for the positioning of the base profile in its lengthwise direction in the tool, whereby no consideration is taken to varying widths of the base profile, and such a variation leads to the positioning in said direction being made possible.

To neglect using the guide surfaces, but instead position the base profiles of different widths in the seat by the eye so that they are positioned and obtain holes in the same corresponding positions is neither rational nor reliable and is not a good solution to the problem.

SUMMARY OF THE INVENTION

The object of the present invention is to develop a tool of the type initially presented, which is suited to make it possible to, rationally and with precision, arrange signs of the actual sort, the tool being arranged to adapt the positioning of base profiles therein in relation to the variation of their width.

According to the invention, this object is obtained as the tool, in accordance with the characterizing part of claim 1, comprises means for displacing the support surfaces generally perpendicularly to the direction coinciding with the longitudinal axis of the base profile, so as to adapt the positioning of the base profile in relation to variations of the width thereof. Thereby, the operator is given the possibility to effect the positioning of base profiles of different widths in the tool more rapidly and with more precision than before. Furthermore, conditions are created for, in a higher degree than previously, automating the function of the tool for arranging the signs, the base profiles of which are of different widths.

A preferred embodiment of the tool according to the invention comprises members for cutting at least one hole in the base profile, means for displacing the support surface for different base profile widths so that the base profiles, irrespectively of width, will obtain a hole at the same corresponding location. One thereby obtains the advantage of a tool which takes immediate consideration to different widths of the base profiles and which makes it possible to position the latter in a suitable way in relation to a further function of the tool, the further function being referred to as the arranging of holes in the base profile.

According to another preferred embodiment of the tool according to the invention, the displacing means comprises a piece which is to be inserted between a wall portion of the tool and the base profile, this piece forming a support surface. Thereby, one obtains the advantage of being able to rapidly and with high precision displace the support surface a certain distance, determined by the dimension of the piece, to adapt the tool to a base profile of a certain width.

Further important features and advantages of the invention will appear from the rest of the patent claims and from the following, detailed description.

BRIEF DESCRIPTION OF THE DRAWINGS

With reference to the disclosed drawings, a more detailed description will follow of an embodiment of the invention, given by way of example.

In the drawings:

FIG. 3 is a perspective view of a sign with base profile and sign elements, FIG. 4 is a perspective view of the sign in FIG. 3, from another direction, FIG. 5 is a partly broken cross sectional view of the tool with a base profile with sign elements inserted therein, FIG. 6 is a perspective view of the tool with a means for displacing the position of the base profile in the tool, FIG. 7 is a perspective view similar to the one of FIG. 6 but with displacing means and base profile of other dimensions.

DETAILED DESCRIPTION OF A PREFERRED EMBODIMENT

Figure 1:
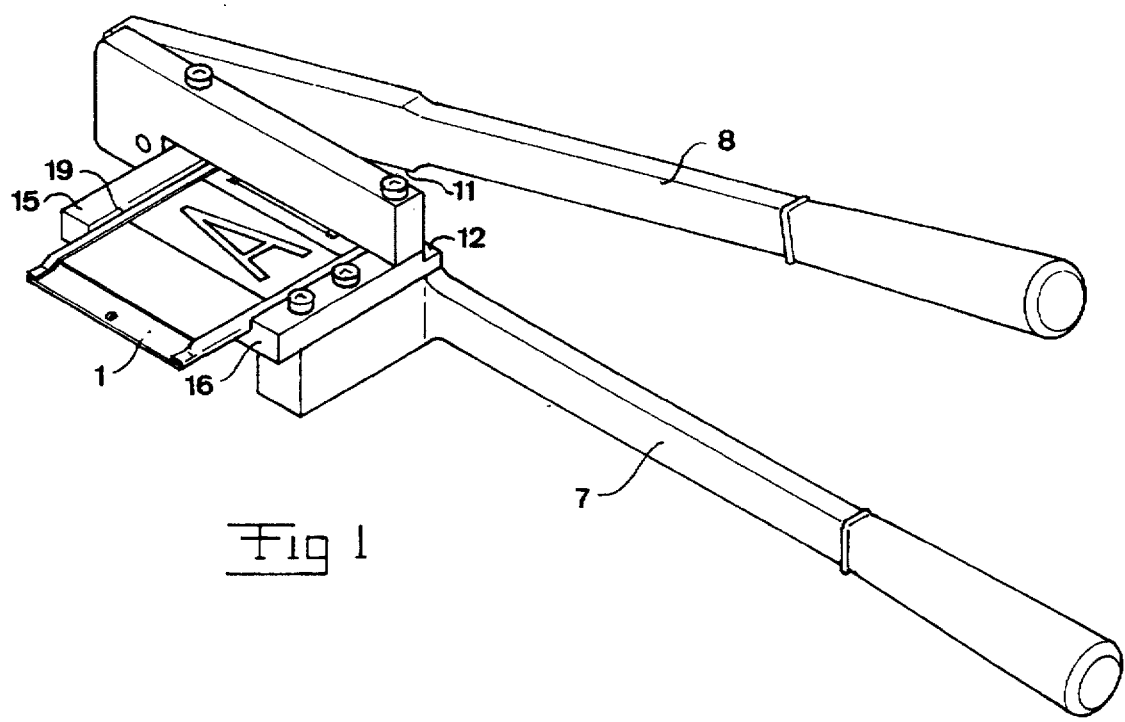
FIG. 1 is a perspective view of the tool according to the invention, with base profile and sign elements positioned therein.
Figure 2:
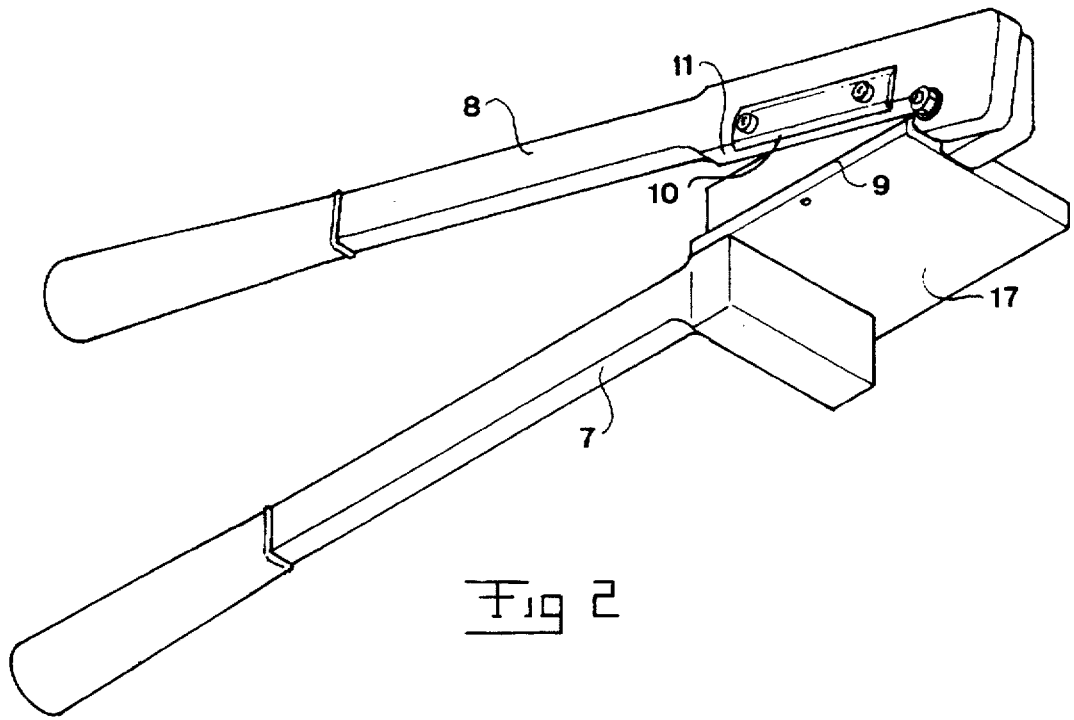
FIG. 2 is a further perspective view of the tool, seen from another direction.
Figure 8:
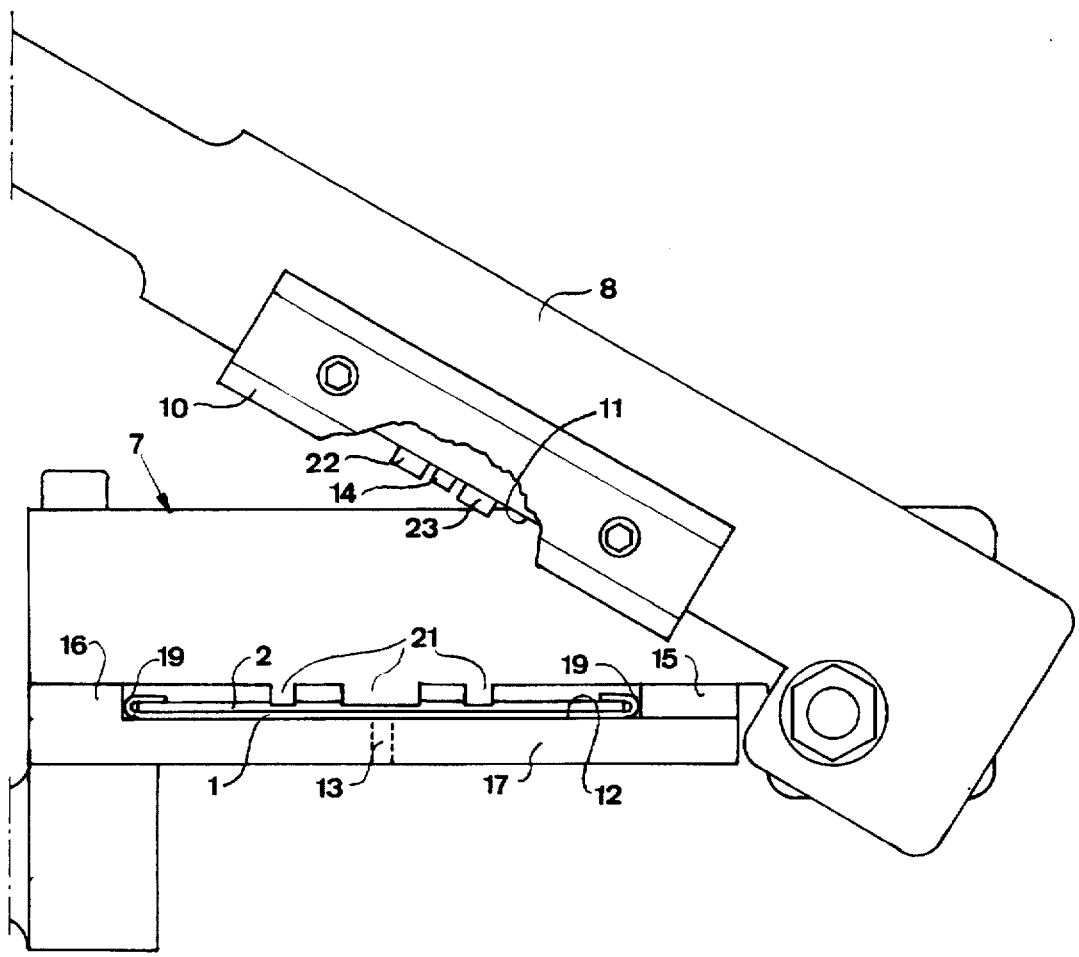
FIG. 8 is a partly broken plane view of the tool, with the base profile with sign elements inserted into it.
Figure 9:
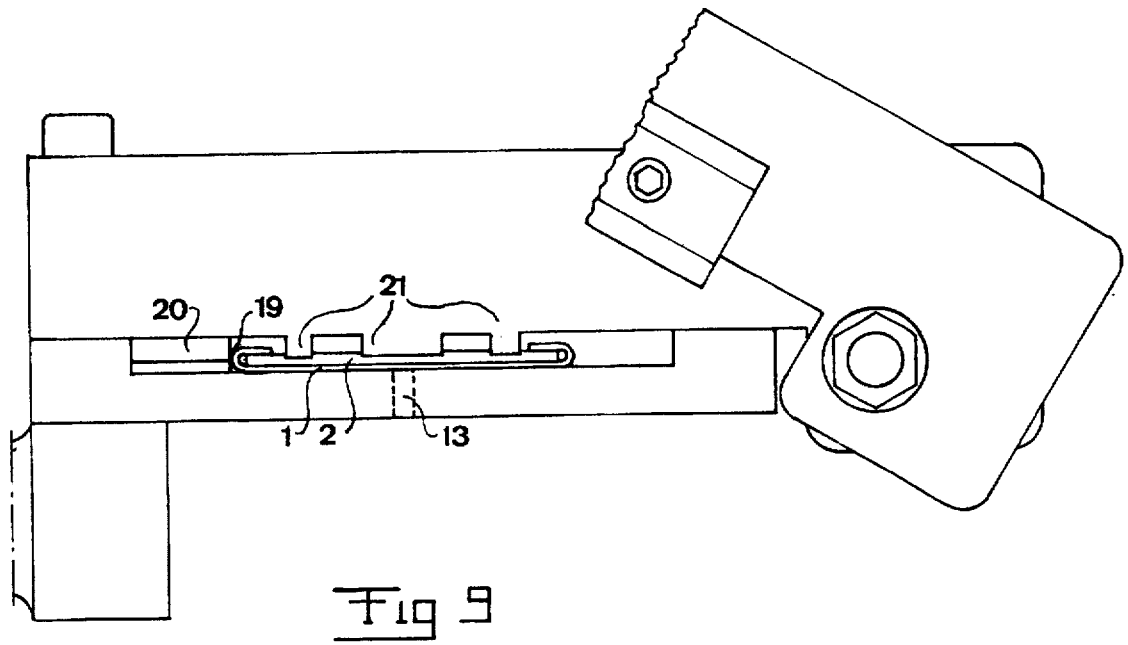
FIG. 9 is a plane view similar to the one of FIG. 8, but with displacing means and base profile of smaller dimension inserted into it.
Figure 10:
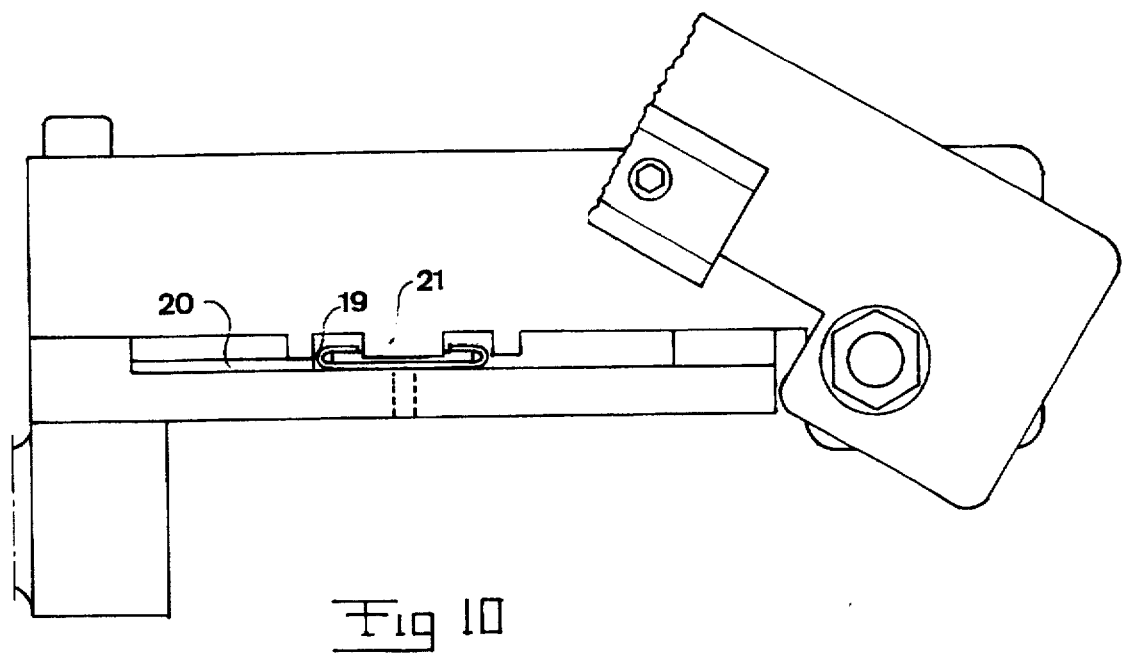
FIG. 10 is a view similar to the one of FIG. 9, but with displacing means and base profile of other dimensions.

The tool according to the invention and according to FIGS. 1, 2 and 5–10 is primarily supposed to be used for the arrangment of signs of the sort illustrated in FIGS. 3 and 4. The sign presents a base profile section 1 and sign display elements 2 engaging therewith. The sign elements 2 are preferably rectangular. The symbols on the sign elements can be accomplished by painting etc, but another possibility is to stamp the intended symbols in the sign elements so that a bottom piece 3 of the base profile 1 becomes visible through the perforations in the sign elements as shown in FIG. 3.

The base profile 1 presents a folded edge portion 4, which extend along the longitudinal edges of the base profile 1, that is the upper and lower edges. The sign elements 2 have a width crosswise to the longitudinal direction of the base profile 1 that the sign elements are received with their upper and lower edge portions between the folded edge portions 4 of the base profile and the base piece 3. A hole 5 is arranged to facilitate the fixing of the sign to an optional support. The hole 5 can, by way of example, receive nails, screws, rivets, thread etc.

To hold the sign elements 2 in place in the base profile 1, the folded edge portions 4 of the latter are deformed at the ends through the portions represented by 6, to form an obstacle that inhibits the sign elements 2 from loosing their engagement with the base profile. With the actual deformation goes that the edge portions 4 in the area of the portions indicated with 6 are compressed toward the base piece 3 of the base profile 1, so that the sign elements 2 cannot be displaced beyond these portions 6.

The tool according to the invention (FIGS. 1, 2 and 5–10) comprises two parts 7, 8 which are displaceable with respect to each other. These handle parts 7, 8 include a respective edge member 9, 10 for cutting the base profile element 1, and a respective compression member 11, 12 for deforming the base profile 1 in the areas indicated with 6 in FIG. 3, to form the obstacles that inhibits the sign elements 2 from loosing their engagement with the base profile 1. The handle parts 7, 8 also include members 13, 14 for punching an aperture or hole 5 in the base profile 1. To obtain a smooth and silent punching of holes and deformation, the tool is also provided with shock absorbing, elastic members 22, 23 which are here arranged in the neighbourhood of the member 14.

According to the definition of the tool according to the invention, at least one support surface 19 towards which the base profile 1 is supposed to be positioned at an angle to the plane for the off-cutting of the same. In the preferred embodiment, the tool comprises two wall portions 15, 16 which, together with the portion 17 located between the latter forms a seat for positioning of base profiles. For certain base profile widths it is suitable that one of the wall portions 15, 16 forms the support surface 19 in accordance with the definition of the invention. What decides if any of the wall portions 15, 16 will form a support surface for a base profile 1 is whether the base profile 1 thereby obtains a suitable position with respect to a further function of the tool. In the preferred embodiment holes are arranged in the base profile by means of members 13, 14 particularly adapted thereto, the further function being referred to as the arranging of holes. As the members 13, 14 for punching of holes, as in the embodiment shown, co-operates at a point between the two wall portions, to accomplish a hole at this point, and one wishes to provide a hole which is generally centered in relation to the width of the base profile, one or both of the wall portions 15, 16 preferably forms the support surface 19 as the base profile width substantially corresponds to the distance between the wall portions 15, 16.

From FIGS. 6, 7 and 9, 10 it can also be seen that the tool comprises means 20 for displacement in a direction generally perpendicularly to a direction coinciding with the longitudinal axis of the base profile 1, so as to adapt the positioning of the base profile 1 in relation to variations of the width thereof. In the preferred embodiment the displacing means comprises a gauge block or a piece 20 which is arranged to be inserted between a wall portion 15 of the tool and the base profile 1, this piece 20 forming said support surface 19 with one surface thereof. As appears from the Figures, the displacing means comprises several pieces 20 which have different dimensions to be able to displace the support surface 19 with reference to one base profile width each. When no displacing means 20 is arranged between the wall portions 15, 16 and the base profile 1, at least one support surface 19 is formed by the wall portions 15, 16. In the preferred embodiment the means 20 for displacing the support surface 19 are arranged to displace the support surface 19 for base profiles 1 of different widths so that the longitudinal center line of the base profiles 1 generally coincides for base profiles of different widths which are positioned in the tool. Thereby, as can be seen from the Figures, it is possible to, by way of example, provide a hole in the base profiles of different widths at the same corresponding location.

A stop member 21 is arranged for delimitation of the displacement of the sign in a direction towards the edge members 9, 10 and is designed to act stoppingly against a sign element 2 present in the base profile 1. In the preferred embodiment, the stop member 21 comprises three tongues, one of which has a width which goes below the distance between the folded portions 4 of a base profile of the smallest width, and of which each of the two other tongues, which are located at the sides of this tongue, is arranged at such a distance from the middle tongue that there is space for a folded portion 4 therebetween. An advantage of this arrangement is that a larger stop member surface thereby is permitted to base profiles of larger width, whereby an exact positioning of the latter is promoted.

Alternatively, the stop member 21 comprises only one tongue, with a width which goes below the distance between the folded portions 4 of a base profile 1 of the smallest width, whereby all base profiles which are larger than this smallest width become possible to position in the tool in a suitable way by means of the stop member 21.

In the preferred embodiment, the tool also comprises means for holding the means 20 for displacing the support surface 19 in position in relation to the tool. Preferably the means for holding the means 20 for displacing the support surface in relation to the tool includes that the means 20 and/or the tool are made of metal and that one of these comprises a magnet, whereby a traction force is obtained between the tool and the displacing means 20. In the preferred example the means is coated with a magnet strip on one of its shod ends, the attraction force arising primarily between the portion 17 and the means 20. To obtain a larger attraction force between the wall portion 15 and the means 20, the strip is suitably arranged at the wall portion or the surface of the means 20 positioned towards the former.

The tool according to the invention is used in the following way: Initially it is seen to that the base profile 1 which is to be used for arranging a certain sign is provided with holes 5 and clamped regions 6 at one of its ends. This can be done by providing actual base profile means at one of their ends with a hole 5 and the clamped regions 6 immediately during the manufacture. Alternatively, it will be possible to effect this by inserting the end of the base profile 1 in the tool before any sign element is inserted in the base profile 1, so that the end thereof is located along with or projecting somewhat beyond the edges 9, 10, whereafter a movement of the tool parts 7, 8 towards each other effects that possibly projecting sections of the base profile 1 gets cut off, a hole 5 is punched by means of the members 13, 14, and clamping of the regions 6 is obtained by means of the members 11, 12. This is done in one single movement of the tool parts towards each other. Thereafter, the base profile 1 is taken out of the tool and a desired combination of sign elements 2 is inserted into it. Subsequently the sign material comprised by base profile 1 and sign elements inserted thereinto are arranged in the tool. The base profile 1 is positioned so that it is supported by a support surface 19 which is formed by any of the wall portions 15, 16, if the base profile is of such a width that its position in the tool thereby is suitable with the stamping of holes in view. If, on the other hand, the width of the base profile 1 is such that a suitable positioning is not obtained while using any of the wall portions 15, 16 as support surface, a means 20 for displacing the support surface 19 is arranged to be supported by one of the wall portions 15, 16 and to form the support surface 19 with one surface thereof, against which support surface the base profile 1 is arranged to bear to take a suitable position with reference to the stamping of holes. From FIGS. 6, 7 and 9, 10 it can be seen that such means 20 of different widths are used for base profiles 1 of different widths. The base profile is arranged to make a stop member 21 thereby bear on the end positioned sign element 2 and delimits the movement of the sign material in a direction towards the edge members 9, 10. Thereafter, the tool parts 7, 8 are once again brought towards each other and thereby the edge members 9, 10 cut the base profile 1 off, the clamping members 11, 12 clamp the edge portions 4 under formation of the clamped regions 6, and the hole 5 is cut out by means of the cutting members 13, 14. These three work operations are obtained in one and the same movement of the tool parts 7, 8 towards each other. After separation of the tool parts 7, 8, the finished sign can be taken out of the tool and then has the appearance which can be seen in FIGS. 3 and 4, that is the sign elements are effectively held between clamped regions 6 located at the ends of the base profile 1. Thereby, the sign is ready to be arranged at a desired location.

For the sake of completeness, it should be pointed out that means 20, for instance in the shape of pieces or gauge blocks in accordance with what is seen in FIGS. 6 and 7, could be arranged so that they define a space between each other which is closely adapted to the width of base profiles with a width smaller than the maximum base profile width that can be used in the tool. Thereby, support surfaces 19 are obtained at both sides of a relevant base profile 1, like the situation when the tool is used for maximum base profile width according to FIG. 1. With particular reference to FIGS. 6 and 7 gauge blocks 20 could, accordingly, be arranged at the opposite side of the base profiles 1 to provide relevant space for the base profile 1 in question between such gauge blocks present in pairs.

An advantage of making the gauge blocks 20 magnetic is that they comfortably can be brought to attach the tool, for instance, as a consequence of their magnetic properties, they could be arranged at any suitable magnetic surface of the tool, for instance the lower side of the portion 17 thereof.

Of course the tool according to the invention can be modified in a plurality of ways within the frame of the invention.

I claim:

1. A tool for manufacturing signs wherein selective sign display elements are retained on a base profile section by folded engagement of opposite edge portions of the base section, said tool comprising at least two handle members relatively displaceable with respect to each other, said handle members defining cutting means for severing the base section, said handle means further including compression means for deforming the base section to secure the sign display elements from disengagement with the base section, one of said handle members defining a guide surface for positional alignment of the base section, compensation means for displacing the guide surface generally perpendicular to a longitudinal axis of the base section to accommodate respective base sections having different width dimensions, stop means extending from another of said handle members for restricting movement of the sign display elements in the direction of the cutting means, said stop means including a first tongue member having a width dimension being less than the distance between the folded opposite edge portions of the base section and positionable in confronting relationship to the sign display elements and a second tongue member being spaced from the first tongue member for accommodating the folded opposite edge portions between the respective first and second tongue members.

2. A tool for manufacturing signs as claimed in claim 1 wherein said stop means includes three tongue members, a middle tongue member having a width dimension being less than the distance between the folded opposite edge portions of the base section and each of the other two tongue members being spaced on respective sides of the middle tongue member a distance sufficient for accommodating a folded opposite edge portion of the base section between each of the respective other two tongue members and the middle tongue member.

3. A tool for manufacturing signs as claimed in claim 1 wherein said handle means further defines punch means for penetrating the base section to provide an aperture.

4. A tool for manufacturing signs as claimed in claim 1 wherein one of said handle members includes a seat means having opposed wall portions for receiving the base section with said compensation means cooperatively interacting with at least one of said wall portions and the base section.

5. A tool for manufacturing signs as claimed in claim 4 wherein the compensation means includes a gauge block, said gauge block being insertable between a wall portion and the base section.

6. A tool for manufacturing signs as claimed in claim 5, further including magnetic means for retaining the gauge block adjacent the wall portion.

7. A tool for manufacturing signs as claimed in claim 3 wherein the compensation means displaces respective base sections having different width dimensions for registration of the punch means at a corresponding location in each base section.

8. A tool for manufacturing signs as claimed in claim 3, wherein the compensation means displaces respective base sections having different width dimensions for registration of the punch means along a longitudinal centerline of the base section.

9. A tool for manufacturing signs wherein selective sign display elements are retained on a base profile section by folded engagement of opposite edge portions of the base section, said tool comprising at least two handle members relatively displaceable with respect to each other, said handle members defining cutting means for severing the base portion, said tool handle members further including compression means for deforming the base section to secure the sign display elements from disengagement with the base section, said handle members further defining punch means for penetrating the base section to provide an aperture, one of said handle members having a seat including opposed wall portions defining a guide surface for positional alignment of the base section, compensation means for severally accommodating base sections of different width dimensions, said compensation means defining gauge blocks cooperatively interacting with an opposed wall portion for selectively displacing the guide surface in a direction generally perpendicular to a longitudinal axis of the base section to thereby register the base section with the punch means and provide correspondence in aperture location.

10. A tool for manufacturing signs as claimed in claim 9 wherein said gauge blocks are magnetically retained on said seat.

11. A tool for manufacturing signs as claimed in claim 9 further including a plurality of gauge blocks, such gauge blocks being incrementally sized for selective insertion between at least one of said wall portions and the base section to provide a desired displacement.

* * * * *